(12) United States Patent
Maeda et al.

(10) Patent No.: US 8,719,802 B2
(45) Date of Patent: May 6, 2014

(54) INTERPROCEDURAL EXCEPTION METHOD

(75) Inventors: Naoto Maeda, Tokyo (JP); Prakash Prabhu, Princeton, NJ (US); Gogul Balakrishnan, Princeton, NJ (US); Franjo Ivancic, Princeton, NJ (US); Aarti Gupta, Princeton, NJ (US)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 257 days.

(21) Appl. No.: 13/249,298

(22) Filed: Sep. 30, 2011

(65) Prior Publication Data

US 2012/0084761 A1    Apr. 5, 2012

Related U.S. Application Data

(60) Provisional application No. 61/388,230, filed on Sep. 30, 2010.

(51) Int. Cl.
*G06F 9/44* (2006.01)
*G06F 9/45* (2006.01)

(52) U.S. Cl.
USPC ........... 717/132; 717/122; 717/129; 717/133; 717/159

(58) Field of Classification Search
CPC ... G06F 11/3604; G06F 11/3608; G06F 8/75; G06F 8/433; G06F 8/443; G06F 8/4441
See application file for complete search history.

(56) References Cited

U.S. PATENT DOCUMENTS

| | | | | |
|---|---|---|---|---|
| 6,279,149 B1 * | 8/2001 | Field et al. | ..................... | 717/129 |
| 6,487,716 B1 * | 11/2002 | Choi et al. | ..................... | 717/159 |
| 8,266,600 B2 * | 9/2012 | Kahlon et al. | ................ | 717/133 |
| 2006/0168565 A1 * | 7/2006 | Gamma et al. | ................ | 717/122 |

OTHER PUBLICATIONS

Saurabh Sinha et al., Analysis of Programs with Exception-Handling Constructs, Nov. 1998, [Retrieved on Mar. 20, 2013]. Retrieved from the internet: <URL: http://ieeexplore.ieee.org/xpls/abs_all.jsp?arnumber=738526&tag=1> 10 Pages (1-10/348-357).*
Andrei Alexandrescu et al., Exception Safety Analysis, Dec. 2003, [Retrieved on Mar. 20, 2013]. Retrieved from the internet: <URL: http://erdani.com/publications/cuj-2003-12.pdf> 5 Pages (40-44).*
Prakash Prabhu et al., Interprocedural Execption Analysis for C++, 2011, [Retrieved on Dec. 27, 2013]. Retrieved from the internet: <URL: http://download.springer.com/static/pdf/347/chp%253A10.1007%252F978-3-642-22655-7_27.pdf?auth66=1388331450_71b3763508b5986aeb0b0811d2667446&ext=.pdf> 26 Pages (583-608).*
David Callahan et al., Analysis of Event Synchronization in a Parallel Programming Tool, 1990 ACM 089791-350-7, [Retrieved on Dec. 27, 2013]. Retrieved from the internet: <URL: http://dl.acm.org/citation.cfm?id=99167> 10 Pages (21-30).*

* cited by examiner

*Primary Examiner* — Don Wong
*Assistant Examiner* — Anibal Rivera
(74) *Attorney, Agent, or Firm* — Joseph Kolodka

(57) ABSTRACT

An interprocedural exception analysis and transformation framework for computer programming languages such as C++ that (1) captures the control-flow induced by exceptions precisely, and (2) transforms the given computer program into an exception-free program that is amenable for precise static analysis, verification, and optimizations.

22 Claims, 19 Drawing Sheets

```
class EOFException { ... };
class IOException { ... };
```

```
string File::readLine() {
    string s;
    try {
        if (invalidFile)
            throw IOException();
        s = read();
        return s;
    }
    catch (EOFException& e) {
        return string("");
    }
}
```

```
string File::read() {
    string str(_line);
    if (EOF)
        throw EOFException();
    return str;
}
```

```
void get () {
    string s;
    try {
        File *file = new File("1.txt");
        file->readLine();
        delete file;
    }
    catch (IOException& ie) {
        cout<< "IO-Failure";
    }
    return;
}
```

FIG. 1

| | | | |
|---|---|---|---|---|
| Constant | $c$ | $\in$ | Constant | |
| Identifiers | $id$ | $\in$ | Identifier | |
| Labels | $l$ | $\in$ | Label | |
| Access | $a$ | ::= | $private \mid protected \mid public$ | |
| Qualifier | $cv$ | ::= | $const \mid volatile \mid restrict$ | |
| Class | $cl$ | ::= | $class\ id : \overline{a\ t\ \{\overline{a\ t\ f_i; a\ virtual?\ m}\}}$ | |
| Type | $t$ | ::= | $id \mid t* \mid t\& \mid t[e] \mid \overline{t} \to t \mid void \mid int \mid float \mid \overline{cv}\ t$ | |
| Variable | $v$ | ::= | $id$ | |
| Lvalue | $lv$ | ::= | $lh.e$ | |
| Lhost | $lh$ | ::= | $v \mid *e$ | |
| Program | $p$ | ::= | $\overline{g}$ | |
| Global | $g$ | ::= | $t\ id \mid f$ | |
| Function | $f$ | ::= | $t\ id\ (\overline{t\ id}) = b$ | |
| Block | $b$ | ::= | $\{\overline{s}\}$ | |
| Statement | $s$ | ::= | $i \mid return\ e? \mid goto\ l \mid break \mid continue \mid$ | |
| | | | $if\ e\ b_1\ b_2 \mid loop\ b \mid throw\ e? \mid trycatch\ b\ \overline{h}$ | |
| Handler | $h$ | ::= | $(t\ v)\ b \mid (\ldots)\ b$ | |
| Instruction | $i$ | ::= | $call\ id\ e_f\ \overline{e} \mid mbrcall\ id\ e_{this}\ e_f\ \overline{e} \mid e := e \mid v := new\ e \mid delete\ e$ | |
| Cast | $cast$ | ::= | $staticcast \mid dyncast \mid constcast \mid reintcast$ | |
| Expression | $e$ | ::= | $c \mid lv \mid unop\ e \mid e\ binop\ e \mid cast\ t\ e \mid \&lv \mid lv\&$ | |

FIG. 2

$$\frac{t_T = t \quad t_C = t}{t_T \leq t_C} \; [\text{EQ}] \qquad \frac{t_T = cv\,t \quad t_C = t}{t_T \leq t_C} \; [\text{CVQUAL}]$$

$$\frac{t_T = t_1 \quad t_C = t_2 \quad t_1 \in sub(t_2)}{t_T \leq t_C} \; [\text{SUBCL}] \qquad \frac{t_T = t_1 \quad t_C = t_2[] \quad t_1 \leq t_2 *}{t_T \leq t_C} \; [\text{ARR}]$$

$$\frac{t_T = t_1 \quad t_C = (\_ \rightarrow t_2) \quad t_1 \leq (\_ \rightarrow t_2) *}{t_T \leq t_C} \; [\text{FPTR}] \qquad \frac{t_T = t \quad t_C = t\,\&}{t_T \leq t_C} \; [\text{REF}]$$

$$\frac{t_T = t_1 * \quad t_C = t_2 * \quad t_1 * \leq_{cons} t_2 *}{t_T \leq t_C} \; [\text{PTR}] \qquad \frac{t_T = std::nullptr\_t \quad t_C = t *}{t_T \leq t_C} \; [\text{NULLPTR}]$$

$$\frac{t_T = t_1 * \quad t_C = void *}{t_T \leq t_C} \; [\text{VOID}]$$

```
Algorithm 5: VisitTryCatchStmt
   Input: s: A trycatch statement where s = b_1 (h_1, h_2, ..., h_k)
   Output: N_b × N_c × N_unrep
 1  let (N_{b_1}, N_{c_1}, N_{unrep_1}) = VisitBlock(b_1); // Creates ECFG region for a block
 2  foreach h_i do
 3  |  let (N_{b_{h_i}}, N_{c_{h_i}}, N_{unrep_{h_i}}) = VisitHandler(h_i) // Creates ECFG region for a handler
 4  end
 5  let S_throw = {n | n ∈ N_{unrep_1} ∧ ir(n) = throw};
 6  let S_cored = {n | n ∈ N_{unrep_1} ∧ ir(n) = call ∧ n ∈ N_cored};
 7  let S_rest = N_{unrep_1} − (S_throw ∪ S_cored);
 8  foreach n_th ∈ S_throw do
 9  |  for i=1 to k do
10  |  |  τ_match = (+, {t}) where h_i = (t v) b;
11  |  |  t_catch = t where h_i = (t v) b;
12  |  |  n_catch_i = n where (n ∈ N_{b_{h_i}}) ∧ (ir(n) = catch);
13  |  |  τ_throw = (+, {t'}) where (ir(n_th) = throw e) ∧ (T_prog(e) = t');
14  |  |  if t' ≤ t_catch then
15  |  |  |  E_excep = E_excep ∪ {(n_th, n_catch_i, τ_throw)};
16  |  |  |  N_done = N_done ∪ {n_th};
17  |  |  |  continue foreach outer loop
18  |  |  end
19  |  end
20  end
21  foreach n_cored ∈ S_cored do
22  |  for i=1 to k do
23  |  |  τ_catch = (+, {t}) where h_i = (t v) b;
24  |  |  τ_cored = ECR_F(n_cored);
25  |  |  τ_intersect = τ_cored ∩_F τ_catch;
26  |  |  τ_remain = τ_cored −_F τ_catch;
27  |  |  ECR_F(n_cored) = τ_remain;
28  |  |  E_excep = E_excep ∪ {(n_cored, n_catch_i, τ_intersect)};
29  |  end
30  end
31  N_reg = N_reg ∪ {n_join};
32  E_reg = E_reg ∪ {(n, n_join) | n ∈ N_{c_1}} ∪ {(n, n_join) | ∃ i such that n ∈ N_{c_{h_i}}};
33  N_b = N_{b_1}; N_c = {n_join}; N_unrep = (∪_{1≤i≤k} N_{unrep_{h_i}} ∪ N_{unrep_1}) − N_done;
```

FIG. 6

Algorithm 6: *VisitBlock*

Input: $b$: Block where $b = s_1, s_2, ..., s_n$
Output: $N_b \times N_c \times N_{unres}$ 1  for $i = 1$ to $n$ do
2      let $(N_{b_i}, N_{c_i}, N_{unres_i}) = VisitStmt(s_i)$;
3  end
4  $E_{reg} = E_{reg} \cup \{(n_1, n_2) \mid \forall i \cdot 1 \leq i < n \cdot (n_1 \in N_{c_i} \wedge n_2 \in N_{b_{i+1}})\}$;
5  $N_b = N_{b_1}; N_c = N_{c_n}; N_{unres} = \cup_{1 \leq i \leq n} N_{unres_i}$;

---

Algorithm 7: *VisitStmt*

Input: $s$: Statement
Output: $N_b \times N_c \times N_{unres}$ 1  switch $typeOf(s)$ do
2      case $instr \in \{call, mbrcall\}$
3         $VisitCallInstr(s)$;
4      case $instr \notin \{call, mbrcall\}$
5         $N_{reg} = N_{reg} \cup \{n_c\}; N_b = N_c = \{n_c\}; N_{unres} = \{\}$
6      case $break \mid continue \mid goto \mid return$
7         $N_{reg} = N_{reg} \cup \{n_c\}; N_b = N_{unres} = \{n_c\}; N_c = \{\}$;
8      case $if\ e\ b_1\ b_2$
9         let $(N_{b_1}, N_{c_1}, N_{unres_1}) = VisitBlock(b_1)$;
10        let $(N_{b_2}, N_{c_2}, N_{unres_2}) = VisitBlock(b_2)$;
11        $N_{reg} = N_{reg} \cup \{n_{if_e}, n_{join}\}$;
12        $E_{reg} = E_{reg} \cup \{(n_{if_e}, n_{b_1}) \mid n_{b_1} \in N_{b_1}\} \cup \{(n_{if_e}, n_{b_2}) \mid n_{b_2} \in N_{b_2}\}$
13           $\cup \{(n_{c_1}, n_{join}) \mid n_{c_1} \in N_{c_1}\} \cup \{(n_{c_2}, n_{join}) \mid n_{c_2} \in N_{c_2}\}$;
14        $N_b = \{n_{if_e}\}; N_c = \{n_{join}\}; N_{unres} = N_{unres_1} \cup N_{unres_2}$;
15     case $loop\ b_l$
16        let $(N_{b_l}, N_{c_l}, N_{unres_l}) = VisitBlock(b_l)$;
17        let $S_{continue} = \{n \mid n \in N_{unres_l} \wedge ir(n) = continue\}$;
18        let $S_{break} = \{n \mid n \in N_{unres_l} \wedge ir(n) = break\}$;
19        $E_{reg} = E_{reg} \cup \{(n_c, n_{l_{head}}) \mid n_c \in S_{continue}\} \cup \{(n_b, n_{l_{exit}}) \mid n_b \in S_{break}\}$;
20        $N_{reg} = N_{reg} \cup \{n_{l_{head}}, n_{l_{exit}}\}$;
21        $N_b = \{n_{l_{head}}\}; N_c = \{n_{l_{exit}}\}; N_{unres} = N_{unres_l} - (S_{continue} \cup S_{break})$;
22     case $throw \mid new \mid dynamic\_cast$
23        $VisitThrowingStmt(s)$;
24     case $trycatch$
25        $VisitTryCatchStmt(s)$;
26
27 endsw

*FIG. 7*

Algorithm 8: *VisitCallInstr*

Input: A *call/mbrcall* instruction
Output: $N_b \times N_e \times N_{unres}$ 1. $N_e = N_e \cup \{n_{e_3}\}$ ; $N_{erret} = N_{erret} \cup \{n_{erret_3}\}$ ; $N_{eeret} = N_{eeret} \cup \{n_{eeret_3}\}$ ;
2. let $\tau_e = (-, \{\})$ ;
3. $E_c = E_c \cup \{(n_{e_3}, n_{eeret_3})\}$ ; $E_{excep} = E_{excep} \cup \{(n_{e_3}, n_{erret_3}, \tau_e)\}$ ;
4. $N_b = \{n_{e_3}\}$ ; $N_e = \{n_{erret_3}\}$ ; $N_{unres} = \{n_{eeret_3}\}$ ;

---

Algorithm 9: *VisitThrowingStmt*

Input: s: A *throw/new/dynamic_cast* statement
Output: $N_b \times N_e \times N_{unres}$ 1. $N_{throw} = N_{throw} \cup \{n_s\}$ ;
2. $N_b = N_{unres} = \{n_s\}$ ; $N_e = \{\}$ ;

*FIG. 8*

Algorithm 10: *VisitHandler*

Input: $h$: A handler where $h = (t\ v)\ b_1$
Output: $N_{b_1}, N_{eq}, N_c \times N_{unres}$ 1  let $(N_{eq}, N_{unres_1}) = VisitBlock(b_1)$;
2  $N_{catch} = \{n_h\}$; $E_{reg} = E_{reg} \cup \{(n_h, n_a) \mid n_a \in N_{b_1}\}$;
3  $N_b = \{n_h\}$; $N_c = N_{eq}$; $N_{unres} = N_{unres_1}$;

---

Algorithm 11: *VisitFunction*

Input: $f$: Function where $f = t\ id\ (\overline{t\ id})$
Output: $G_{inter_f} = \langle n_{b_f}, n_{e_f}, n_{exceps_f}, N, E \rangle$ 1   let $(N_{b_1}, N_{e_1}, N_{unres_1}) = VisitBlock(b_1)$;
2   $E_{reg} = E_{reg} \cup \{(n_{e_f}, n) \mid n \in N_{b_1}\} \cup \{(n, n_{e_f}) \mid n \in N_{e_1}\}$;
3   foreach $n \in S_{exit}$ where $S_{exit} = \{n \mid n \in N_{unres_1} \wedge ir(n) = return\}$ do
4   $\quad E_{reg} = E_{reg} \cup \{(n, n_{e_f})\}$;
5   end
6   foreach $n \in S_{throw}$ where $S_{throw} = \{n \mid n \in N_{unres_1} \wedge ir(n) = throw\}$ do
7   $\quad E_{excep} = E_{excep} \cup \{(n, n_{excep_f}, T_{prop}(ir(n)))\}$;
8   end
9   foreach $n \in S_{goto}$ where $S_{goto} = \{n \mid n \in N_{unres_1} \wedge ir(n) = goto\} \mid n_{tgt} \in Node(Label(ir(n)))\}$ do
10  $\quad E_{reg} = E_{reg} \cup \{(n, n_{tgt})\}$;
11  end
12  for $n \in N_{secret}$ do
13  $\quad \tau_{secret} = ECR_F(n_{secret})$;
14  $\quad E_{excep} = E_{excep} \cup \{(n, n_{excep_f}, \tau_{secret})\}$
15  end
16  return $\langle n_{b_f}, n_{e_f}, n_{excep_f}, N, E \rangle$

*FIG. 9*

```
// EXCEPTION SPECIFICATIONS:
// void get()        throw (std::bad_cast);
// string read()     throw (EOFException);
// string readline() throw (IOException);
#define EXCEP_NULL 0
#define EXCEP_BAD_CAST 1
#define EXCEP_IO_EXCEPTION 2
define EXCEP_EOF_EXCEPTION 3 class EOFException {...};
class IOException {...};
```

```
string File::readLine(IOException& e2,
                      ExcepId& id) {
    string s; EOFException e1;
    ExcepId lid = EXCEP_NULL;

if (invalidFile) {
        IOException tmp; e2 = tmp;
        id = EXCEP_IO_EXCEPTION;
        ~s();
        goto Exit_2;
    }
    s = read(e1, lid);
    switch (lid) {
    case EXCEP_EOF_EXCEPTION:
        goto Catch_L1;
        break;
    default:
        break;
    }
    return s;
Catch_L1: {
    EOFException e = e1;
    return string("");
}
Exit_2: return string();
}
```

```
string File::read(EOFException& e1,
                  ExcepId& id) {
    string str(__line);
    if (EOF) {
        EOFException tmp; e1 = tmp;
        id = EXCEP_EOF_EXCEPTION;
        ~str();
        goto EExit_1;
    }
    return str;
EExit_1: return string();
}
```

```
void get (std::bad_cast& e3, ExcepId &id) {
    string s; IOException e4;
    ExcepId lid = EXCEP_NULL;

File *file = new_alloc("1.txt");
    if (file == NULL) {
        std::bad_cast tmp;
        e3 = tmp; id = EXCEP_BAD_CAST;
        goto Catch_L2;
    }
    file->readLine(e4, lid);
    switch (lid) {
    case EXCEP_IO_EXCEPTION:
        goto Catch_L2;
        break;
    default:
        break;
    }
    delete file;
    return;
Catch_L2: {
    cout << "IO-Failure";
}
EExit_2;
}
```

FIG. 11

```
...
try {
    StdioStream *in = new StdioStream (stdin, 0);
    in->open ();
    FilterIconvStream cvt (*in, (string)argv[1], (string)argv[2], 0,
        mu_fallback_none);
    cvt.open ();
    delete in;
    ...
}
catch (Exception& e) {
    cerr << e.method () << ": " << e.what () << endl;
    exit (1);
}
```

*FIG. 13*

Algorithm 12: *BuildInterECFG*

Input: p: Program
Output: $I_G = \langle N_c, N_x, N_{excep}, G_{inter} \rangle$ $G_{inter} = \bigcup_f \in p \ G_{intra, f};$
2  foreach $calltriple \ (n_{call}, n_{cret}, n_{excepret}) \ \textbf{do}$
3　　$F = CallTargets(irr(n_{call}));$
4　　for $f$ in $F$ do
5　　　　let $G_{intra, f} = \langle n_{s,f}, n_{x,f}, n_{ex,f}, N_f, E_f \rangle;$
6　　　　let $E_c = E_c \cup \{(n_{call}, n_{s,f}),(n_{x,f}, n_{cret})\};$
7　　　　let $T_{cxit} = \bigcup_{e_p \in \text{epredecs}(n_{ex,f})} \ excepE_{IT}(e_p);$
8　　　　$E_{excep} = E_{excep} \cup \{(n_{ex,f}, n_{excepret}, T_{exit})\};$
9　　end
10　$E_c = E_c - \{(n_{call}, n_{cret})\};$
11　$E_{excep} = E_{excep} - \{(n_{call}, n_{excepret})\};$
12 end

*FIG. 14*

Algorithm 13: *InterProceduralExceptionAnalysis*

Input: $I_G = \langle N_s, N_a, N_{execeps}, G_{inter} \rangle$
Input: $I_{G'} = \langle N_s, N_a, N_{execeps}, G_{inter'} \rangle$ 1  $W_{list} = N_{execeps} \cup \bigcup_{f \in M} N_{exert,f}$;
2  while $W_{list}$ *is not empty* do
3     $n \leftarrow removeNode(W_{list})$;
4     $\tau_{n,old} = excepN_T(n)$;
5     $\tau_{n,new} = \bigcup_{\Gamma_{ep} \in preds(n)} excepE_T(e_p)$;
6     if $\tau_{n,old} \neq_T \tau_{n,new}$ then
7        switch *typeOf(n)* do
8           case *ExcepExit*
9              foreach $e_s \in succe(n)$ do
10               $excepE_T(e_s) = \tau_{n,new}$;
11               $W_{list} = W_{list} \cup \{dst(e_s)\}$;
12            end
13          case *ExcepCallReturn*
14             foreach $e_s \in succe(n)$ do
15               $excepE_T(e_s) = \tau_{n,new} \cap_T excepE_T(e_s)$;
16               if $typeOf(dst(e_s)) = ExcepExit$ then
17                  $W_{list} = W_{list} \cup \{dst(e_s)\}$;
18               end
19            end
20       endsw
21       $excepN_T(n) = \tau_{n,new}$;
22    end
23 end

*FIG. 15*

Algorithm 14: *ComputeUncaughtExceptions*

Input: $I_G = \langle N_s, N_e, N_{except}, G_{inter} \rangle$
Output: $except_F : F \rightarrow T_{prog}$ 1  let $T_{except} = \{\}$;
2  for $n_t \in N_{throw}$ do
3     $except_F(n_t) = T_{prog}(ir(n_t))$;
4     $T_{except} = T_{except} \cup T_{prog}(ir(n_t))$
5  end
6  for external function $f$ do
7     $except_F(f) = \{t_{unknown}\}$
8  end
9  $F_l = ReverseTopoOrder(CG_{SCC})$;
10 while $F_l$ is not empty do
11    $F_{scc} = RemoveFront(F_l)$;
12    for $f \in F_{scc}$ do
13      $except_F(f) = \bigcup except_F(n_t)$ where $(n_t \in N_{throw}) \land (\exists g \cdot g \in F_{scc} \land ir_n(n_t) \in g)$
14    end
15    for $f \in F_{scc}$ do
16      switch $exceptN_F(n_{except})$ where $n_{except} = N_{except}(f)$ do
17         case $(+, T_E)$
18            $except_F(f) = T_E$
19         case $(-, T_E)$
20            foreach $g \in TransitiveCallees(f)$ do
21               $except_F(f) = except_F(f) \cup except_F(g)$;
22            end
23            $except_F(f) = except_F(f) - T_E$;
24      endsw
25    end
26 end

*FIG. 16*

Table 1. Results of interprocedural exception analysis and exception safety checks.

| Benchmark | Simplified LOC | ECFG Build Time(s) | IECFG Build & Analysis Time(s) | #Excep Edges before Analysis | #Excep Edges after Analysis | "No throw" guarantee Coverage (% Functions) | "No leak" check results (#detected /#actual) |
|---|---|---|---|---|---|---|---|
| multiple-live | 479 | 0.01 | 0.01 | 10 | 6 | 71 % | 0/0 |
| ctor-throw | 585 | 0.02 | 0.02 | 33 | 11 | 89 % | 1/1 |
| recursive | 643 | 0.02 | 0.03 | 27 | 17 | 64 % | 0/0 |
| shared-inherit | 667 | 0.02 | 0.04 | 59 | 27 | 71 % | 1/1 |
| bintree-duplicate | 770 | 0.06 | 0.05 | 31 | 13 | 91 % | 0/1 |
| list-baditerator | 784 | 0.04 | 0.04 | 36 | 17 | 79 % | 0/2 |
| virtual-throw | 809 | 0.02 | 0.03 | 39 | 28 | 46 % | 0/4 |
| nested-try-catch | 809 | 0.03 | 0.03 | 33 | 17 | 68 % | 2/2 |
| loop-break-cont | 814 | 0.04 | 0.03 | 35 | 19 | 68 % | 2/2 |
| nested-rethrow | 820 | 0.04 | 0.03 | 30 | 15 | 76 % | 4/4 |
| new-badalloc | 849 | 0.02 | 0.03 | 51 | 28 | 67 % | 2/2 |
| template | 860 | 0.03 | 0.04 | 35 | 16 | 81 % | 1/1 |
| dyn-cast | 872 | 0.03 | 0.05 | 9 | 7 | 40 % | 1/1 |
| iolib | 919 | 0.01 | 0.01 | 63 | 62 | 53 % | 1/1 |
| delegat-dtor-throw | 1305 | 0.04 | 0.05 | 73 | 71 | 58 % | 0/0 |
| std-uncaught-dtor | 1348 | 0.05 | 0.07 | | | | 1/1 |

FIG. 17

Table 2. Results of interprocedural exception analysis on open-source benchmarks

| Open-source Benchmark | Simplified LOC | ECFG Build Time(s) | IBCFG Build & Analysis Time(s) | #Excep Edges before Analysis | #Excep Edges after Analysis | "No throw" guarantee Coverage (% Functions) |
|---|---|---|---|---|---|---|
| tinyxml | 4884 | 0.39 | 1.41 | 1204 | 830 | 74 % |
| mailutils | 8365 | 0.19 | 0.36 | 494 | 316 | 78 % |
| coldet | 8422 | 0.27 | 0.22 | 591 | 20 | 98 % |
| id3lib | 14070 | 1.73 | 4.18 | 2091 | 372 | 93 % |

FIG. 18

INTERPROCEDURAL EXCEPTION METHOD

This application claims the benefit of U.S. Provisional Application No. 61/388,230, entitled, "Guaranteeing Exception Safety in C++ Using Interprocedural Exception Analysis", filed Sep. 30, 2010 of which the contents is incorporated herein by reference.

TECHNICAL FIELD

This disclosure relates generally to the field of computer software and in particular to an interprocedural exception framework for computer programming languages—for example C++—that produces an exception-free program suitable for static analysis.

BACKGROUND

Exceptions are an important error handling aspect of many programming languages, especially object-oriented languages such as C++ and Java. Exceptions are oftentimes used to indicate unusual error conditions during the execution of an application—for example, resource exhaustion—and provide a way to transfer control to special-purpose exception handling code. The exception handling code deals with the unusual circumstance and either terminates the program or returns control to the non-exceptional part of the program—if possible. Consequently, exceptions introduce additional—and oftentimes complex—interprocedural control flow into the program in addition to any standard—non-exceptional—control flow.

SUMMARY

An advance in the art is made according to an aspect of the present disclosure directed to structures and computer-implemented methods for handling interprocedural exceptions in computer programming languages—and by way of specific example—C++.

In contrast to the prior art, we present an interprocedural exception analysis and transformation framework for C++ that (1) captures the control-flow induced by exceptions precisely, and (2) transforms the given C++ into an exception-free program that is amenable for precise static analysis.

More particularly, we describe a modular abstraction for capturing the interprocedural control flow induced by exceptions in C++, called the interprocedural exception control flow graph (IECFG). The IECFG is constructed through a sequence of steps, with each step refining it. The modular design of IECFG is motivated by the need to model implicit calls to destructors during stack unwinding, when an exception is thrown. The modularity of IECFG is also important in practice, for permitting re-use in presence of separate compilation units.

Additionally, we design and implement an interprocedural exception analysis method to model the set of C++ exceptions that reach catch statements in the program using the Signed-TypeSet domain, which represents a set of program types compactly. Our analysis method is formulated in conjunction with the construction of the IECFG. Advantageously, our method safely terminates the IECFG construction at certain well-defined points during interprocedural propagation, thereby, allowing clients, such as optimizing compilers or program analysis, to trade-off speed over precision. For example, an optimizing compiler can use the results of the analysis to determine functions that do not throw exceptions and perform optimizations that were not possible earlier because the compiler assumed that an exception may be raised.

Furthermore, we present a lowering method that uses the results of our exception analysis to generate an exception-free C++ program. Unlike standard compilers, our method does not use non-local jumps or calls into any opaque C++ runtime systems. Advantageously, the absence of an external runtime and non-local jumps enables existing static analyses and verification tools to work soundly over C++ programs with exceptions, without needing to model them explicitly within their framework. While the IECFG construction is modular in the sense of allowing separate compilation units, the lowering algorithm to generate exception-free code is not modular. It requires a global view of all source code under analysis so that all known possible targets of virtual function calls can be determined.

Finally, we show the results of using our interprocedural exception analysis and transformation framework on a set of C++ programs. We compute the exception specifications for functions and check the related "no throw" guarantee. We also check the "no leak" exception-safety property.

BRIEF DESCRIPTION OF THE DRAWING

A more complete understanding of the present disclosure may be realized by reference to the accompanying drawings in which:

FIG. 1 shows an example of a running program suitable for analysis according to an aspect of the present disclosure;

FIG. 2 shows an abstract syntax for a simplified intermediate language for C++ according to an aspect of the present disclosure;

FIG. 3 shows exception subtyping rules for C++ as defined in the final C++ draft standard;

FIG. 4 shows a number of operations on the signed-TypeSet domain according to an aspect of the present disclosure;

FIG. 6 shows a VisitTryCatch routine for ECFG construction according to an aspect of the present disclosure;

FIG. 7 shows VisitBlock and VisitStmt routines for ECFG construction according to an aspect of the present disclosure;

FIG. 8 shows VisitCallInstr and VisitThrowingStmt routines for ECFG construction according to an aspect of the present disclosure;

FIG. 9 shows VisitHandler and VisitFunction routines for ECFG construction according to an aspect of the present disclosure;

FIG. 11 shows program listings for exception specifications and exception-free program(s) for the running example of FIG. 1 according to an aspect of the present disclosure;

FIG. 13 is a program listing showing a memory leak along an exception path in iconv according to an aspect of the present disclosure;

FIG. 14 shows BuildInterECFG routine according to an aspect of the present disclosure;

FIG. 15 shows InterProceduralExceptionAnalysis according to an aspect of the present disclosure;

FIG. 16 shows ComputeUncaughtExceptions according to an aspect of the present disclosure;

FIG. 17 shows a Table 1 of results of interprocedural exception analysis and exception safety checks according to an aspect of the present disclosure;

FIG. 18 shows a Table 2 of results of interprocedural exception analysis on open-source benchmarks according to an aspect of the present disclosure;

DETAILED DESCRIPTION

Figure 5:
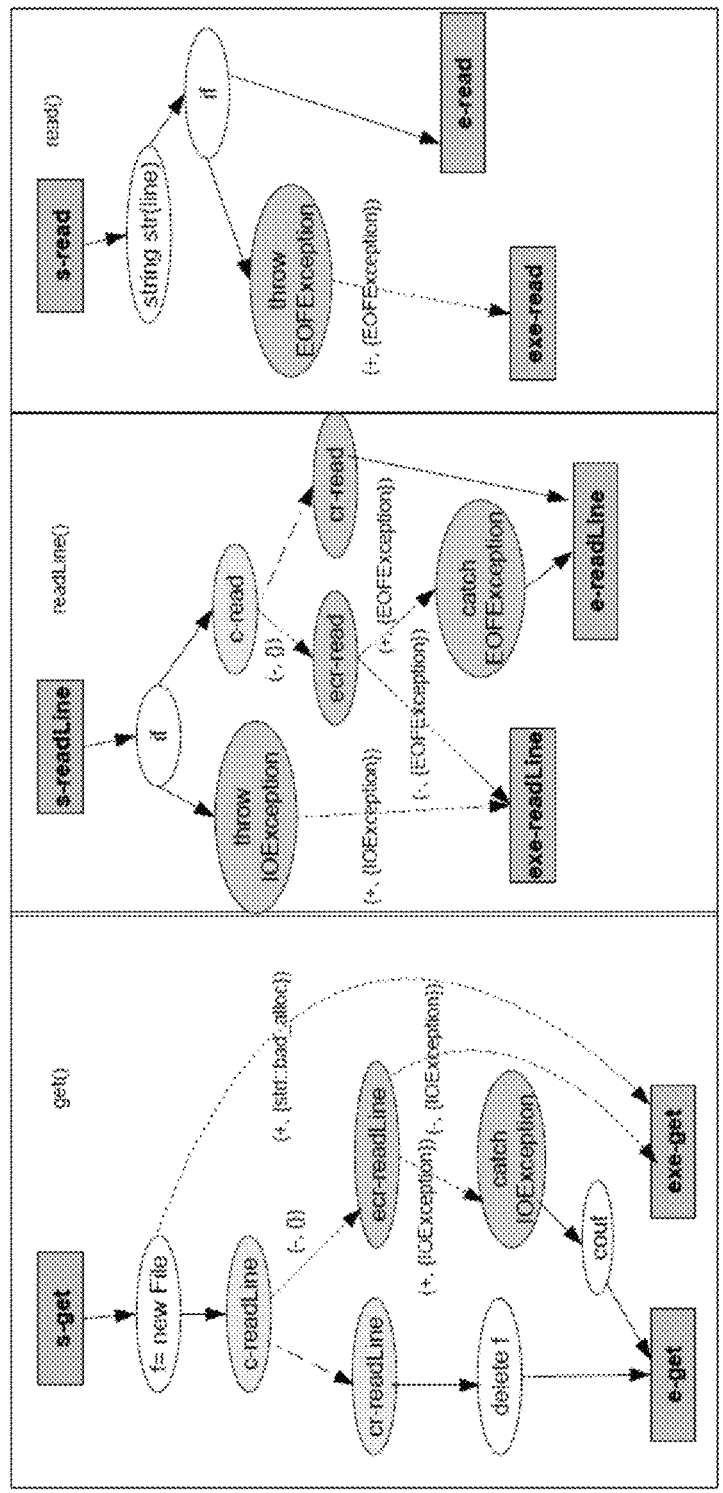
FIG. 5 is a schematic showing interprocedural Exception Control Flow Graphs (ECFG) for the program of FIG. 1 according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

Introduction

Exceptions are an important error handling aspect of many programming languages, especially object-oriented languages such as C++ and Java. Exceptions are often used to indicate unusual error conditions during the execution of an application (resource exhaustion, for instance) and provide a way to transfer control to special-purpose exception handling code. The exception handling code deals with the unusual circumstance and either terminates the program or returns control to the non-exceptional part of the program, if possible. Therefore, exceptions introduce additional, and often complex, interprocedural control flow into the program, in addition to the standard non-exceptional control flow.

The interprocedural control flow introduced by exceptions necessitate global reasoning over whole program scope, which naturally increases the potential for bugs. Stroustrup developed the notion of exception safety guarantees for components. Informally, exception safety means that a component exhibits reasonable behavior when an exception is raised. The term "reasonable" includes all the usual expectations for error-handling: resources should not be leaked, and that the program should remain in a well-defined state so that execution can continue. Stroustrup introduced various degrees of exception safety guarantees that can be expected from components:

No leak guarantee: If an exception is raised, no resources such as memory are leaked.

Basic guarantee: In addition to the no leak guarantee, the basic invariants of components (for example, properties that preserve data structure integrity) are maintained.

Strong guarantee: In addition to the basic guarantee, this requires that an operation either succeeds or has no effect, if an exception is raised.

No throw guarantee: In addition to the basic guarantee, this requires that an operation is guaranteed not to raise an exception.

However, it is difficult to ensure such exception-safety properties, because developers may overlook exceptional control-flow hidden behind multiple levels of abstraction. For instance, in a code block containing local objects as well as exceptions, programmers have to reason about non-local returns induced by exceptions, and at the same time understand the effects of the implicit calls to the destructors of local objects along the exception path correctly.

Unlike Java, all C++ exceptions are unchecked, and library developers are not required to annotate interfaces with exception specifications. Furthermore, dynamic exception specifications (anything other than noexcept specification) are deprecated in the latest C++0x draft standard. Consequently, developers increasingly rely on documentation to discern throwable exceptions from a function interface (more so in the absence of source code), which makes it hard to reason about programs that use library functions that throw (generate and/or exhibit) exceptions. Therefore, a tool that automatically models the behavior of exceptions precisely would be useful.

Existing Approaches to C++ Exceptions.

By way of some additional background, it is noted that program analysis techniques, both static and dynamic, are often applied in the context of program optimization, automatic parallelization, program verification, and bug finding. These techniques rely heavily on both intraprocedural and interprocedural control flow graph information, which are utilized to compute relevant information as needed (e.g., dependence analysis or program slicing). However, existing compiler frameworks for C++ (for example g++, clang/LLVM) do not build precise models for exceptions. Specifically, they only analyze exceptional control flow within a locally declared trycatch statement, and do not perform either an intraprocedural or interprocedural analysis. Therefore, they make conservative assumptions about interprocedural control flow, which causes their models to include paths between throw statements and catch blocks that are infeasible at runtime. An alternative approach is to use such frameworks to generate a semantically equivalent C program from the given C++ program and use the lowered C code for further analysis. However, the code generated by these tools use custom data structures and involves calls into opaque runtimes, which need to be modeled conservatively in static analysis algorithms, resulting in further loss in precision.

Our Approach

In contrast to the prior art, we present an interprocedural exception analysis and transformation framework for C++ that (1) captures the control-flow induced by exceptions precisely, and (2) transforms the given C++ into an exception-free program that is amenable for precise static analysis. We summarize our framework as including the following aspects.

A modular abstraction for capturing the interprocedural control flow induced by exceptions in C++, called the interprocedural exception control flow graph (IECFG). The IECFG is constructed through a sequence of steps, with each step refining it. The modular design of IECFG is motivated by the need to model implicit calls to destructors during stack unwinding, when an exception is thrown. The modularity of IECFG is also important in practice, for permitting re-use in presence of separate compilation units;

An interprocedural exception analysis method to model the set of C++ exceptions that reach catch statements in the program using the Signed-TypeSet domain, which represents a set of program types compactly. Our method is formulated in conjunction with the construction of the IECFG. A unique feature of our framework is the capability to safely terminate the IECFG construction at certain well-defined points during interprocedural propagation, thereby, allowing clients, such as optimizing compilers or program analysis, to trade-off speed over precision.

A lowering algorithm that uses the results of our exception analysis to generate an exception-free C++ program. Unlike standard compilers, our method does not use non-local jumps or calls into any opaque C++ runtime systems. Advantageously, this absence of an external runtime and non-local jumps enables existing static analyses and verification tools to work soundly over C++ programs with exceptions, without needing to model them explicitly within their framework. And while the IECFG construction is modular in the sense of allowing separate compilation units, the lowering method which generates exception-free code is not modular. It requires a global view of all source code under analysis so that all known possible targets of virtual function calls can be determined.

Finally, the results of using our interprocedural exception analysis and transformation framework on a set of C++ programs is presented. We compute the exception specifications for functions and check the related "no throw" guarantee. We also check the "no leak" exception-safety property.

EXAMPLE

Consider the C++ program shown in FIG. 0. The program has three functions, of which get( ) allocates a File object and attempts to read a line from File by calling readLine( ). If the file does not exist, readLine( ) throws an IOException that is handled in the get( ) function. Otherwise, a call is made to read( ) which throws an EOFException if the end of the file is reached, which is handled in readLine( ). An exception modeling framework has to abstract the interprocedural control flow due to exceptions correctly, and also take into account the implicit calls made to destructors during stack unwinding, when an exception propagates out of a function (e.g., destruction of str in read( ) when EOFException is thrown).

There are two bugs worth noting in this example, both of which have to do with exceptions: (1) violation of "no leak" guarantee, the file object gets leaked along the exception path from readLine( ) to the catch block in get( ) and (2) violation of "no throw" guarantee, a potential std::bad_alloc exception thrown by new is not caught in get( ). Our exception analysis and transformation framework enables checking these properties easily.

Comparison with Java Exception Analysis.

Several analysis approaches for modeling Java exceptions have been proposed in the recent past. A number of these approaches compute an interprocedural exception control flow graph as is done here, and there have been some attempts to analyze the "no leak" exception-safety guarantee for Java programs also.

However—as one skilled in the art may appreciate—there are a number of major differences between exception handling in Java and C++, which require different design decisions in comparison to Java-based exception analysis techniques.

First, with C++, when an exception propagates out of a function, destructors are invoked on all stack-allocated objects between the occurrence of the exception and the catch handler in a process called stack unwinding. Stack unwinding in C++ is a major difference compared to Java, and raises various performance issues, along with complicating the modeling of exceptional control-flow.

Second, C++ destructors can call functions which throw exceptions internally, leading to a scenario where multiple exceptions are live during stack unwinding. Unlike implicitly invoked destructors, Java provides "finalizers", that are invoked non-deterministically by the garbage collector. Although the use of "finally" blocks in Java can result in multiple live exceptions, these blocks are created and controlled explicitly by the programmer, and therefore, multiple live exceptions in Java are apparent from the code itself.

Third, the exception subtyping rules for Java are limited to only parent-child relationships within the class hierarchy. Besides, all exception classes trace their lineage to a single ancestor, the Exception class. In contrast, C++ exception subtyping rules are richer and include those concerning multiple inheritance, reference types, pointers, and few other explicit type-conversion rules among functions as well as arrays.

Fourth, the exception specification and checking mechanism in Java is much stronger than in C++. In particular, Java has a "checked exception" category of exceptions, which explicitly requires programmers to either catch exceptions thrown within a function, or declare them as part of the interface. In sharp contrast, C++ has no concept of checked exceptions, and the dynamic exception specifications are deprecated in the latest C++0x standards draft. Exception specifications in C++ may not even be accurate, which results in a call to std::unexpected( ) function, which may be redefined by an application.

Fifth, C++ provides an exception probing API while Java does not. It (C++) provides a means to conditionally execute code depending on whether there is an outstanding live exception by calling std::uncaught_exception( ). This can be used to decide whether or not to throw exceptions out of a destructor. Additionally, C++ also allows users to specify abnormal exception termination behavior by providing custom handlers for std::terminate( ) or std::unexpected( ).

Finally, sixth, Java exceptions are handled based on runtime types, whereas in C++ static type information is used to decide which catch handler is invoked. Therefore, pointer analysis is required in Java to improve the accuracy of matching throw statements with catch blocks. For C++, we can avoid a heavy duty pointer analysis for exceptions. (However, call graph construction in C++ can be improved with the results of a pointer analysis on function pointers and virtual function calls.)

Preliminaries

We may now describe an abstract syntax of a simplified intermediate language (IL) for C++ used within our framework. The language is based on CIL, with additional constructs for object-oriented features. FIG. 2 shows the subset of the actual IL that is relevant for the exception analysis and transformation framework. Types within our IL include the primitive ones (int, float, void) as well as user defined classes (cl), derived types (pointer, reference and array), function types, and can additionally be qualified (const, volatile, restrict). Each class type can inherit from a set of classes, and has a set of fields and member functions, some of which may be virtual. Visibility of the class members and the inherited classes is controlled by an access specifier.

As is known, a program is a set of globals. A global is either a type or a function. A function has a signature and a body, which is a block of statements. Statements include instructions, regular control flow statements (loop, if, trycatch), irregular control flow statements causing either local (goto, break, continue) or global (throw, return) alterations. An instruction is one of the following: an assignment, an allocation operator, a deallocation operator, a global function call, or a member function call. Finally, expressions could involve binary operators, unary operators, pointer dereferences or indirections, reference indirections, and cast operations.

C++ Exceptions.

C++ exceptions are synchronous. Asynchronous exceptions, which in Java are raised due to internal errors in the virtual machine, are categorized as program errors in C++ and are not handled by the exception constructs of C++. Synchronous exceptions, in contrast, are expected to be handled by the programmer and are only thrown by certain statements in the program, such as (a) throw statement, which throws a fresh exception or rethrows a caught exception, (b) function call, which transitively throws exceptions uncaught within its body or its callees, (c) new operator, which can throw a std::bad_alloc_exception, and (d) dynamic_cast, which can throw a std::bad_cast exception.

Exception Handling and Subtyping Rules for C++.

Exceptions in C++ are caught using exception handlers, defined as part of the trycatch statement. Each trycatch statement has a single try block followed by a sequence of exception (catch) handlers. An exception object thrown from within the try block is caught by the first handler whose declared exception type matches the thrown exception type according to the C++ exception subtyping rules. If no match is found for a thrown object amongst the handlers, control flows either to an enclosing trycatch statement or out of the function to the caller.

The exception subtyping rules for C++ as defined in the final C++0x draft standard are shown in FIG. 3. The type of a thrown exception is given by $t_T$ and the type declared in the exception handler is given by $t_C$ in each rule. A handler is a match for an exception, if any of the following conditions hold:

The handler's declared type is the same as the type of the exception, even when ignoring the const-volatile qualifiers (Rules EQ and CVQUAL).

The handler's declared type is an unambiguous public base class of the exception type. Arrays are treated as pointers and functions returning a type are treated as pointers to function returning the same type (Rules SUBCL, ARR, FPTR and CVQUAL).

The handler's declared type is a reference to the exception type (Rule REF).

The handler's declared type is a pointer into which the exception type, which also is a pointer, can be converted using C++ pointer conversion rules (Rule PTR).

The two remaining rules concern generic pointers modeled by void* and std::nullptr_t (Rules NULLPTR and VOID).

Signed-TypeSet Domain

We now present an abstract domain for compactly representing a set of program types, which we call—for example—the Signed-TypeSet domain.

DEFINITION 1

The Signed-TypeSet domain $\Gamma$ is defined as: $\Gamma = \{(s, T_{prog}) | s \in \{+, -\}, T_{prog} \subseteq \{t | t \text{ is a program exception type}\}\}$ The semantics of a positive set of exception types is the standard one, while a negative set of exception types represents "every exception type other than those in the set". For instance $(+, \{IOException\})$ represents the IOException program type alone, while $(-, \{IOException, EOFException\})$ represents any exception type other than IOException and EOFException. Exceptions thrown by unknown library calls are modeled concisely as $(-, \{\})$. For external library calls, a special unknown exception type $t_{unknown}$ is introduced explicitly only at the point when the lowering transformation is to be done.

We use a signed domain in our framework, rather than a domain of only positive set of program types to make the IECFG computation modular. Its use is especially beneficial in the presence of unknown library calls and deprecated use of dynamic exception specifications in C++. A negated set of types succinctly captures the unknown exceptions that could potentially be thrown by opaque library calls that are not caught. We would also like to incrementally integrate the results of exception analysis from separately compiled functions whenever available, while at the same time maintaining a safely analyzable exception result at all intermediate points. Therefore, our exception dataflow analysis begins with an over-approximation of the set of all exception types that could be raised by a throwable statement, and refines the set via interprocedural propagation. This deliberate design decision allows clients to terminate the analysis at any point during the analysis and safely use the refined IECFG structure at that point for other analyses.

Figure 4:
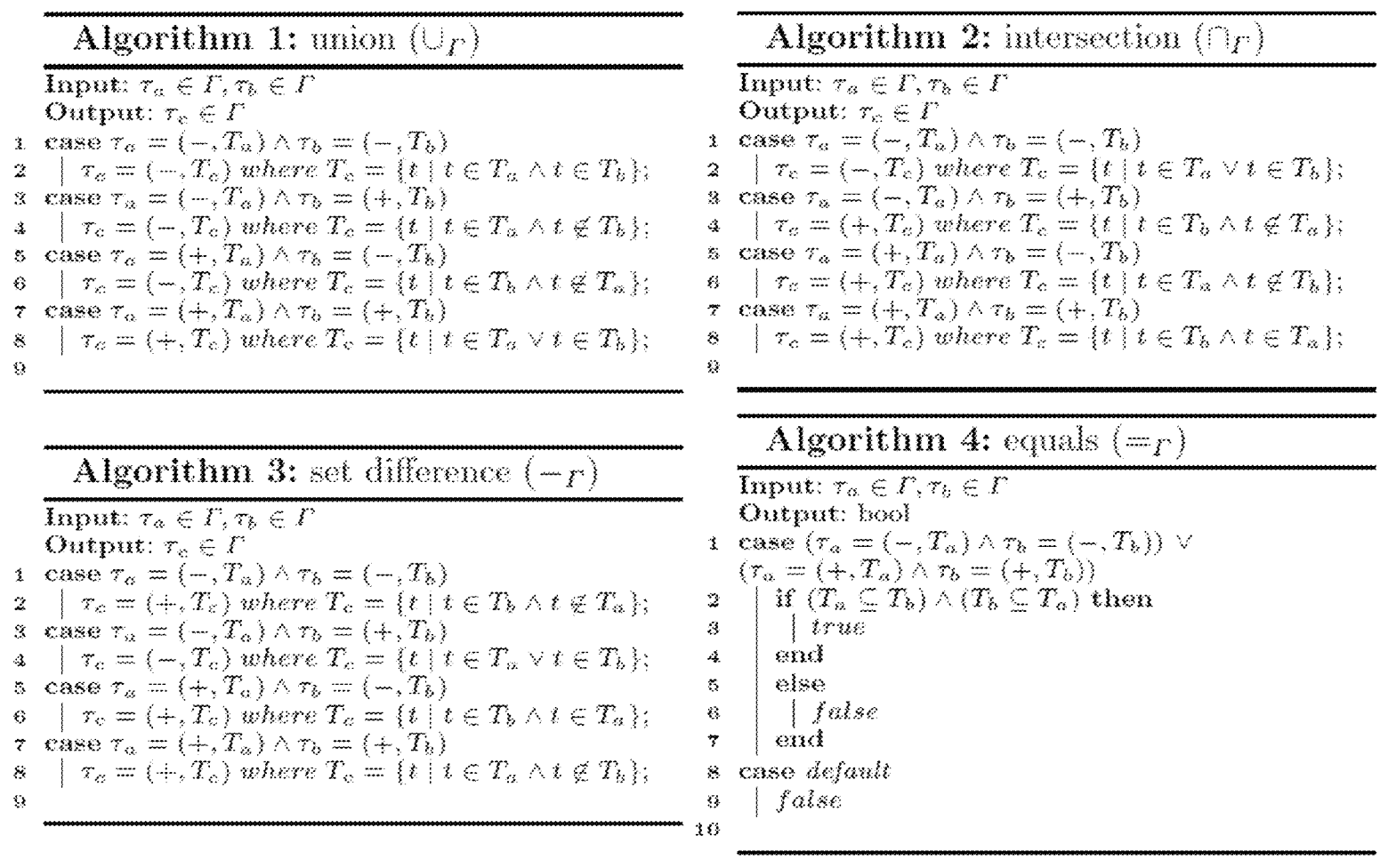

We define set operations on $\Gamma$, that are as efficient as the set operations on normal sets. These operations (shown in FIG. 4) mimic the normal set union, intersection, difference, and equality operations. Given two elements $\tau_a$ and $\tau_b$ from $\Gamma$, these operations result in another element $\tau_c$ in $\Gamma$. All the operations perform a case analysis on the signs of the two elements, and perform normal set operations on the constituent set of program types. The operations are fairly straightforward, and in their full generality need to take into account the exception subtyping rules described earlier. For the sake of conceptual simplicity, we assume that the set of exception types arising at the catch blocks have already been expanded to contain all possible "exception subtypes" in the program, before doing the specific set operations. However, in our implementation, we perform these operations without doing full expansion and correctly account for exception subtypes on demand.

Intraprocedural Exception Control Flow Graph

An intraprocedural exception control flow graph is defined as follows:

DEFINITION 2

An intraprocedural exception control flow graph (ECFG) for a function $f$, denoted by $G_{infra_f}$ is a tuple $\langle N, E_{reg}, E_{excep}, E_{exceps}, E_c, n_s, n_e, n_{excepe}\rangle$ with Signed-TypeSet domain $\Gamma$, where N is the set of nodes in the graph, consisting of the following distinct subsets:

$$N = N_{reg} \cup N_c \cup N_{cret} \cup N_{ecret} \cup N_{throw} \cup N_{catch} \cup \{n_s, n_e, n_{excepe}\}$$

where
- $N_{reg}$ is the set of regular nodes.
- $N_c$ is the set of call nodes.
- $N_{cret}$ is the set of call-return nodes.
- $N_{ecret}$ is the set of exceptional-call-return nodes.
- $N_{throw}$ is the set of throw, new, or dynamic_cast nodes.
- $N_{catch}$ is the set of header nodes of catch blocks.
- $n_s, n_e, n_{excepe}$ are unique start, exit and exceptional-exit nodes.
- $E_{reg}$ is the set of regular control flow edges:
  $E_{reg} \subseteq (N_{reg} \cup N_{cret} \cup N_{catch}) \times N$
- $E_{excep}$ is the set of intraprocedural exception control flow edges:

$$E_{excep} \subseteq ((N_{ecret} \cup N_{throw}) \times (N_{catch} \cup \{n_{excepe}\}) \times \Gamma)$$

$E_{exceps}$ is the set of exception-call-summary edges:

$$E_{exceps} \subseteq (N_c \times N_{ecret} \times \Gamma)$$

$E_c$ is the set of normal call-summary edges:

$$E_c \subseteq N_c \times N_{cret}$$

EXAMPLE

ECFG Structure

The ECFGs for the functions in our running example are shown in FIG. 5. Consider the ECFG for the get( ) function. In addition to the start (s-get) and exit (e-get) nodes present in regular CFGs, the ECFG has a new exceptional-exit (exe-get) node. Control flows through an exceptional-exit node, every time an exception propagates out of a function. Each call instruction is represented by three nodes: in addition to the call node (c-readLine) and call-return node (cr-readLine) present in regular CFGs, the ECFG has a new exceptional-call-return node (ecr-readLine) through which control flows when the callee terminates with an exception. The ECFG has two additional exception-related nodes: throw node, one for every potential throwing statement, and catch-header node, one for every catch block in the code.

There are three kinds of edges in a ECFG: (a) normal control-flow edge (solid lines) as in any CFG, (b) normal call-summary edges (long-dashed lines) between call and call-return nodes, and (c) exception edges (short-dashed lines) which can either be a summary edge (between call and exceptional-call-return nodes) or a normal exception edge (for intraprocedural exceptions). Every exception edge is annotated with an element from the Signed-TypeSet domain $\Gamma$. The exception annotations represent the dataflow facts used in our interprocedural exception analysis, as will be described.

ECFG Construction.

The algorithm to construct the ECFG of a program performs a post-order traversal on the abstract syntax tree (AST) of the C++ code, creating a set of ECFG nodes and edges as it visits each AST node. Each visit method returns a triple $\langle N_b, N_e, N_{unres}\rangle$, where $N_b$ and $N_e$ represent the set of nodes corresponding to start and normal exit of the ECFG "region" corresponding to the current AST node. $N_{unres}$ represents the set of nodes in an ECFG region that has some unresolved incoming or outgoing edges, which are resolved by an ancestor's visitor. For instance, a throw node that is not enclosed within a trycatch block is resolved at the root (function declaration), by creating an exception edge to the exceptional-exit node. Algorithm 2 (FIG. 4) shows the visit routine for a trycatch statement. We note that in C++ programs, new and dynamic_cast operators may also throw bad_alloc and bad_cast exceptions, respectively. For sake of clarity, Algorithm 2 only considers throw. Our implementation however, deals with new and dynamic_cast operators properly.

The VisitTryCatchStmt routine (See, FIG. 6—Algorithm 5) for trycatch statements works as follows: it first constructs the ECFG nodes and edges for the try block and all the catch handlers, by visiting them recursively (Lines 1-4). It then divides the exception-related ECFG nodes in the try block into two sets: (a) the throw nodes[1], and (b) the exceptional-call-return nodes (Lines 5-7). For the throw nodes, a match is sought in the sequence of handlers by applying the C++ exception subtyping rules described earlier. As soon as the first match is found, an exception edge is created from the throw node to the catch header node, annotated with the appropriate exception information from the Signed-TypeSet domain (Lines 8-18). For the throw nodes, this information is always a positive set with a singleton exception type, which is the type of the throw expression.

For an exceptional-call-return node $n_{ecret}$, a map $ECR_\Gamma$ is used during the search for an exception-type match amongst the handlers. $ECR_\Gamma$ maps an exceptional-call-return node to an element from the Signed-TypeSet domain. Initially, $ECR_\Gamma$ holds "all exception types" ((−, { })), which represents the most conservative assumption as far as possible exceptions thrown from a call are concerned, for all exceptional-call-return nodes. Every time a catch block is encountered and a possible match occurs, $ECR_\Gamma(n_{ecret})$ is incrementally updated to hold the "remaining exception types" that could be thrown from this call (using the difference operator $-_\Gamma$). The final value of $ECR_\Gamma(n_{ecret})$ is used to annotate the edge between the $n_{ecret}$ and the exceptional-exit node of the function. At every match with a catch header node, an exception edge is created from the exceptional-call-return node to the catch header, annotated with appropriate exception information (Lines 20-28). The VisitTryCatchStmt routine creates a header node $(n_{try})$ and a join $(n_{join})$ node, in addition to those created by its children (Lines 30-32).

The handling of the exceptional-call-return node illustrates one distinguishing feature of our approach, as compared to other exception analysis algorithms proposed for Java: the dataflow facts are initialized with an over-approximation, which can be refined using the exception information from the catch-header node. Our choice of the Signed-TypeSet domain, which allows a negative set of exception types, not only permits modeling of unknown library calls within the same framework, but also permits a safe termination of our analysis at any point after the construction of the intraprocedural exception flow graphs.

FIGS. 7, 9, and 13 show the Visit routines for the remaining IL constructs. The VisitBlock routine (Algorithm 6) is straightforward, recursively visiting each child statement and then creating edges between corresponding nodes. The VisitStmt routine (Algorithm 7) creates ECFG nodes and edges differently based on the type of AST node. For if and loop statements, it creates ECFG regions with appropriate join and header nodes (Lines 8-21), while for some of the non-exception unstructured control flow statements like break, goto, it creates unresolved nodes (Lines 6-7), which are patched later on by their parents.

The VisitCallInstr routine (FIG. 8—Algorithm 8) creates three nodes and two edges for a call instruction. The three nodes are a call node $n_{c_i}$, a call-return node ($n_{ecret_i}$) and an exceptional-call-return node ($n_{ecret_i}$). The two edges are a summary edge connecting $n_{c_i}$ with $n_{ecret_i}$, and an exceptional-summary edge connecting $n_{c_i}$ with $n_{ecret_i}$. The exceptional-summary edge is annotated with the most approximate element (−, { }), which represents any exception type. The exception return node $n_{ecret_i}$ is unresolved since its targets are determined by the enclosing trycatch statements or by the exceptional-exit-node at function scope.

The VisitThrowingStmt routine (FIG. 8—Algorithm 9) creates an unresolved node for the throw statement, while the VisitHandler routine (FIG. 9—Algorithm 10) creates a header node corresponding to the catch block, and connects it to the nodes created for the statements within the block. The VisitFunction (FIG. 9—Algorithm 11) routine is the main driver for creating the ECFG for a function. Once the ECFG region for the function body is created, this routine connects the return nodes to the normal exit nodes and throw nodes to the exceptional-exit node. It finally resolves the unmatched exceptional-call-return nodes by connecting them to the exceptional-exit node, annotated with appropriate exception type annotation.

EXAMPLE

In FIG. 5, the ECFG for get( ) has an exceptional-call-return node for readLine( ). The algorithm creates an exception edge from this node to a catch header that handles IOException exceptions and annotates the edge with (+, {IOException}). The algorithm then creates an exception edge to the exceptional-exit node of get( ) annotated with (−, {IOException}), which is meant to read "If readLine( ) throws any exception other than IOException, control is transferred to the exceptional exit node of get( )".

Interprocedural Exception Analysis

Once the intraprocedural graphs have been constructed, they are connected together to form an interprocedural exception control flow graph, which is defined as follows:

DEFINITION 3

An interprocedural exception graph (IECFG) is defined by the tuple $I_G = \langle N_s, N_e, N_{excepe}, G_{inter} \rangle$, where $N_s, N_e, N_{excepe}$ are the set of exceptional-exit nodes of the constituent ECFGs, respectively, and $G_{inter}$ is the union of set of intraprocedural graphs of the functions in the program.

IECFG Construction.

Algorithm 12 (BuildInterECFG) (See, FIG. 14) shows the algorithm for constructing the interprocedural graph from the intraprocedural graphs. Initially, the interprocedural graph consists of the union of all the intraprocedural graphs, constructed independently, as described previously. In the next step, the call graph is consulted to determine the call targets for each call site. At each call site, three edges are added: (a) a call edge from call node to start node of the target's intraprocedural graph, (b) a call-return edge from the normal exit node of the target's intraprocedural graph to the call-return node of the function call, and (c) an exception edge from the exceptional-exit node of the target's intraprocedural graph to the exceptional-call-return node in the graph. The exception edge is annotated with the union ($\cup_\Gamma$)) of the exception information on incoming exception edges of the exceptional-exit node, which serves as the initial dataflow fact for the interprocedural exception analysis. Finally, the summary edges connecting the call node with the call-return and exceptional-call-return nodes are removed.

Interprocedural Exception Analysis.

Given that the IECFG construction algorithm initially gives a safe overapproximation of the interprocedural exception flow, the goal of the interprocedural analysis is to refine the dataflow facts on the exception edges as precisely as possible. Algorithm 13 (FIG. 15) shows the interprocedural exception analysis algorithm. A single top-down propagation pass on the call graph will not model exceptions precisely in the presence of recursive functions. Therefore, we need to perform a dataflow analysis. Our analysis operates only on the exceptional-exit and exceptional-call-return nodes, and their incoming and outgoing edges. The abstract domain is the Signed-TypeSet domain as defined previously. The analysis is implemented using a worklist $W_{list}$, which initially has the set of exceptional-exit and exceptional-call-return nodes in reverse topological order on the $CG_{SCC}$, the directed acyclic graph of strong connected components formed from the call graph. Each iteration of the algorithm removes a node from $W_{list}$, applies a transfer function, updates its outgoing exception edges with the new dataflow facts and adds the successors nodes to $W_{list}$, if the data flow information has changed. The algorithm is continued until the $W_{list}$ is empty, at which point the algorithm terminates with a fixed point. Termination of the algorithm is guaranteed due to the fact that the set of exceptions is finite.

A map excepN$_\Gamma$ defines the most recent dataflow information, an element from the Signed-TypeSet domain, corresponding to each exceptional-exit or exceptional-call-return node. Another map excepE$_\Gamma$ is used to hold the exception annotation on each exception edge. It is initialized to the union ($\cup_\Gamma$) of the exception information on the incoming edges for each node, and is updated every time the result of $\cup_\Gamma$ changes. The transfer functions for the exceptional-exit and exceptional-call-return nodes differ in how they update the exception annotation on the outgoing edges, once $\cup_\Gamma$ is computed as follows.

For an exceptional-exit node, each outgoing edge's exception annotation is replaced by the newly computed information at the exit node. This operation reflects the refined set of all of possible (uncaught) exception types that could be thrown from a function, represented in the Signed-TypeSet domain (Lines 8-12 in Algorithm 13).

For an exceptional-call-return node, each outgoing edge's old exception annotation, is replaced by an intersection ($\cap_\Gamma$) of the old exception annotation with the new exception information available at the node. The intersection operation serves to narrow the set of exception types that was previously assumed for a function call, and hence, iteratively increases the precision of the interprocedural exception flow graph (Lines 13-19 in Algorithm 13).

Uncaught Exceptions.

At the end of the analysis, some of the exception edges in the IECFG will have empty exception annotation, which can be eliminated. Empty exception annotations are identified in two phases. The first phase can be done immediately after the analysis, in which those that use a positive sign ((+, { })) can be removed. The second phase removes an empty exception annotation that uses a negative sign, and requires conversion of the exception information from the Signed-TypeSet domain to the domain of positive set of types. Algorithm 14 (FIG. 16) shows the conversion algorithm, which is done only once, after the analysis is performed and also serves as a checker for the "no throw" guarantee. The algorithm walks the $CG_{SCC}$ in reverse topological order, and at each step, uses the set of all exception types (positive) that could potentially be thrown by the transitive callees of a function, to serve as the universal set, from which to subtract the negated set of exceptions corresponding to the current function. Whenever a SCC of mutually recursive functions is encountered, the union of the set of uncaught exception types of each constituent function in the SCC is used as a sound overapproximation for the subtrahend. The algorithm, produces a map $excep_F$ that gives for each function the set of potentially uncaught exception types.

EXAMPLE

Figure 10:
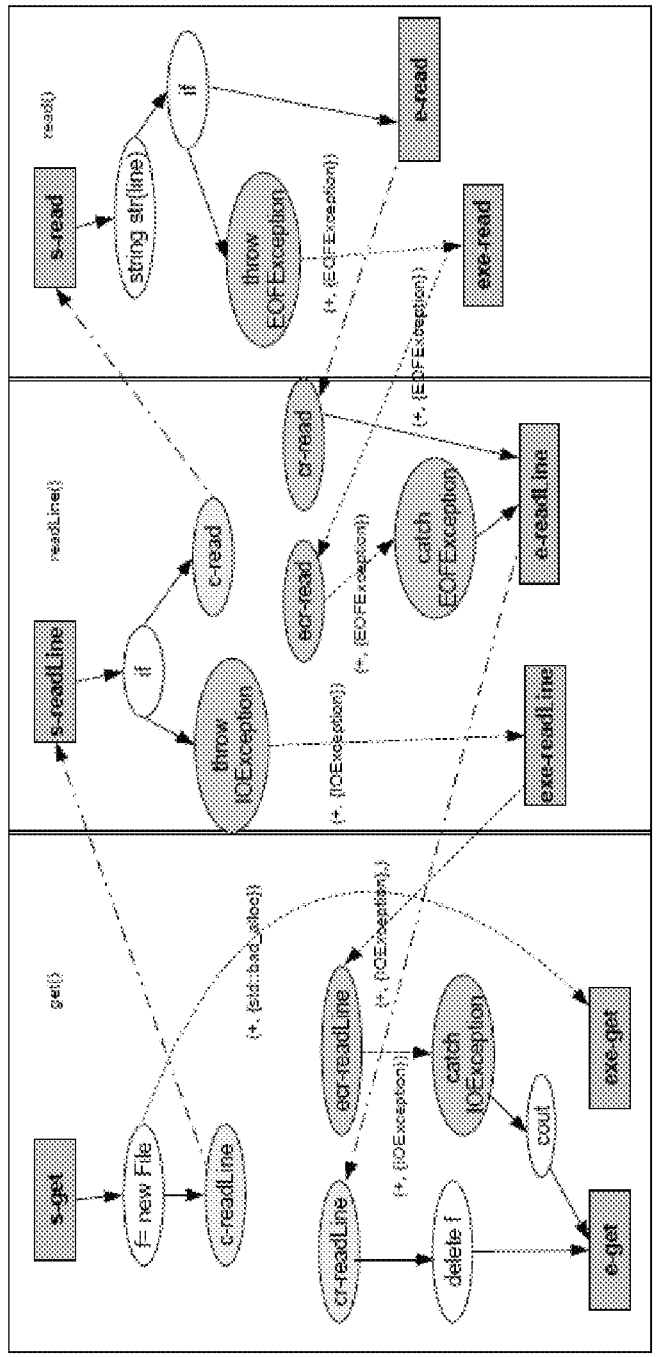
FIG. 10 shows an Interprocedural Exception Control Flow Graph for the program of FIG. 1 according to an aspect of the present disclosure.

FIG. 10 shows the final interprocedural exception control flow graph for our example. The exception edges: ecr-readLine→exe-get and ecr-read→exe-readLine are notably missing from the graph. The analysis is able to infer this after performing the intersection operation, between exception information on incoming and outgoing edges of ecr-readLine and ecr-read:

(+,{IOException})∩$_r$(−,{IOException})=(+,{ }) and (+,{EOFException})∩$_r$(−,{EOFException})=(+,{ }).

However, we see that the program may potentially fail with the uncaught exception std::bad_alloc thrown in get( ) by the new operator.

Generating an Exception-Free Program

In this section, we describe our lowering algorithm that translates a given C++ program into a semantically equivalent program without exception-related constructs such as throw, catch, etc. The lowering algorithm uses the IECFG to eliminate exception-related constructs. As will become apparent to those skilled in the art, there are at least two advantages of our lowering algorithm compared to existing C++ compilers.

First, our approach uses a combination of stack storage and reference parameters to simulate exceptions without generating additional runtime calls whose semantics have to be taught to existing static analysis tools.

Second, our approach uses the exception target information available in the IECFG, and therefore, when compared to existing C++ lowering techniques, generates fewer infeasible edges between throw statements and catch blocks that are not present in the original program. It also handles insertion of destructors correctly. The modular design of the IECFG makes it easy to insert the destructor calls in a single pass.

Steps associated with our lowering algorithm include:

1. Creation of Local Exception-Objects and Formal Parameters: Each function's (say $f$) local variable list is extended with: (1) a "type-id" variable, and (2) a local exception-object variable for every exception type that can potentially be thrown within $f$. The "type-id" variable holds the type of the thrown exception, and the local exception-object variable holds the thrown exception object and acts as storage for interprocedural exception handling. Additional parameters are added to $f$'s signature: (1) a reference parameter for every uncaught exception type that propagates out of the function, and (2) a reference parameter to hold the "type-id". These reference parameters propagate information about uncaught exceptions to a caller. At each call-site of $f$, appropriate local exception-objects and the caller's local type-id are passed additionally as parameters to $f$.

2. Lowering throws and catch: Based on the targets of throw statements in the IECFG, calls to the destructors of appropriate set of local objects are inserted. The thrown object is assigned to the local exception-object of the appropriate type and the local type-id variable is set to the thrown type. A goto is then inserted either to a catch block or to the exceptional-exit node. At the catch block, the local exception-object is assigned to the argument of the catch-header.

3. Lowering exceptional-call-return nodes: A switch statement (modeled using ifs in our IL) on the local type id is inserted, with one nested case for every uncaught exception type in the callee. The target node information from the IECFG is used to place calls to destructors of appropriate stack-allocated objects, for each case. Finally, a goto to the target (either a catch or an exceptional-exit) is inserted.

4. Lowering exception exit node: The local exception-objects and type-ids are copied into corresponding formal parameters. This serves to copy the exception objects out of the callee into the caller, which deals with the uncaught exceptions at its exceptional-call-return node.

The semantics preserving nature of the lowering algorithm can be established as follows. Our lowering mechanism is based on the observation that exception handling preserves functional scoping even though exceptions result in non-local control flow. This is because the program has to unwind the call stack to invoke the destructors of local objects that have been constructed in the functions on the call stack until the exception is caught. Therefore, it largely mirrors the flow that happens during a regular call return. Our lowering mechanism mimics this flow by placing the destructor calls before the exceptional return of every function and passing pending exception objects through the additional reference parameters that were added by the lowering.

Subtleties introduced by some C++ features are handled as follows:

Throwing Destructors. As per the C++0x standards draft, destructors throwing an exception during stack unwinding result in a call to std::terminate( ) which by default terminates the program. However, the destructor's callees can throw exceptions as long as they do not flow out of the destructor. Multiple live exceptions arising out of this are correctly handled in our lowering algorithm by the use of (a) local exception objects, which implicitly helps to maintain a stack of multiple outstanding exceptions, and (b) a global exception flag to detect a throwing destructor instance and trigger a call to std::terminate( ).

Virtual Functions throwing different exceptions. Multiple function targets at a call site, quite common in C++ due to virtual functions, can in general throw different exception types. Our lowering algorithm prevents ambiguity in the function signature by generating a uniform interface at the call site, that uses the union of exception types that can be thrown by each possible target of a virtual function call.

Catch-all and rethrow. A catch-all clause (catch ( . . . )) does not statically indicate the type of C++ exception handled by the clause. Rethrow statements (throw;) do not have a throw expression as an argument. Our lowering algorithm requires type and variable information, which is obtained by using the exception information from the IECFG. Since the IECFG has an edge to a catch clause annotated with the type of each possible exception thrown, the catch-all clause is expanded to a sequence of concrete clauses. Rethrows are handled by using the exception information from the nearest enclosing catch clause.

Exception Subtyping. The lowering algorithm assumes that the type of thrown exception is the same as the type of the catch clause, which may not be true in general due to the exception subtyping rules of C++. This case is handled by generating super class (w.r.t exception subtyping rules) local and formal exception objects, and assigning into them, thrown exception objects which are subclasses of the superclass object.

Example. The lowered code for our running example is shown in FIG. 11 after performing copy propagation to remove redundant local objects. FIG. 11 also shows the exception specifications for functions. (The specification has details of the pending call stacks for each uncaught exception, but is not shown here.)

Implementation and Experiments

We have implemented our exception analysis and transformation algorithms in an in-house extension of CIL, which handles C++ programs. The exception analysis implementation has about 6,700 lines of OCAML code.

Figure 12:
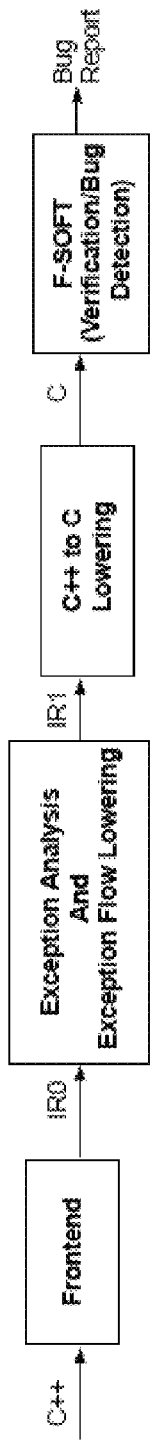
FIG. 12 is a flow diagram depicting the steps associated with Exception Analysis and Transformation Workflow according to an aspect of the present disclosure.

FIG. 12 shows the workflow for analyzing and transforming C++ programs with exceptions. The given C++ program is initially parsed by our frontend into a simplified intermediate version of C++ (IR0) similar to the IL shown earlier. The IR0 code is then fed to our interprocedural exception analysis and transformation framework, which produces lowered C++ code without exceptions. The transformed C++ code is then lowered to C by a module that lowers various object-oriented features into plain C. The C++-to-C lowering module transforms features such as inheritance and virtual-function calls without the use of runtime structures such as virtual-function and virtual-offset tables. Therefore, the lowered source code is still at a relatively high-level for further static analysis. The lowered C code is then fed into F-Soft, where standard bug detection and verification tools that work on C are applied.

We have evaluated our exception analysis and transformation algorithms on a set of C++ programs. The programs test usage of various C++ exception features in realistic scenarios, some of which are close to standard C++ collection class usage. We used the results of our analysis to test the "no throw" guarantee, immediately before lowering, and the results of our transformation to test the "no leak" guarantee using F-Soft. For the experiments, exceptions of type $t_{unknown}$ from external library calls were omitted. Table 1 (See, FIG. 17) shows the results.

The running time for ECFG construction for all programs is low, while the IECFG construction and analysis is quite comparable, with most of the time spent in the interprocedural exception analysis. Our interprocedural exception analysis is able to achieve an average reduction of about 38% in the number of exception edges, with the IECFG constructed immediately before the interprocedural analysis serving as the baseline. On an average, around 66% of the functions in a program were certified as "no throw".

The last column of Table 1 shows the results of running F-Soft, specifically a memory leak detector module, on the lowered programs. Thirteen of the sixteen benchmarks that we used for these experiments had memory leaks along exception paths, and F-Soft reported all memory leaks in 10 of the 13 benchmarks. F-Soft failed to find memory leaks for 3 benchmarks due to timeouts and reported bogus witnesses only for new-badalloc due to the limitation of our in-house C-lowering. For these experiments we used a time-bound of 10 minutes for the verification.

One of the reasons for the timeouts is that the lowering algorithm generates programs that is atypical of the C source code that F-Soft has previously analyzed, which affects the performance of the model checker. As an example, we have found that the addition of destructor calls during stack unwinding on exceptional edges introduces many additional destructor call sites; in the benchmark std-uncaught-dtor, there were 31 call sites to a particular class destructor. The additional destructor calls during stack unwinding yield function call graphs that are very different from what F-Soft usually encounters. Therefore, additional heuristics, such as selective function inlining for destructor calls, will likely improve the performance of the model checker on the models generated by the exception analysis module.

Results on open-source benchmarks. We have also applied the IECFG construction algorithm on a set of open-source benchmarks shown in Table 2 (See, FIG. 18). The coldet benchmark is an open source collision detection library used in game programming. GNU mailutils is an open source collection of mail utilities, servers, and clients. TinyXML v2.5.3 is a light-weight XML parser, which is widely used in open-source and commercial products. The open source library id3lib v3.8.3 is used for reading, writing, and manipulating ID3v1 and ID3v2 tags, which are the metadata formats for MP3s. Table 2 shows the reduction in the number of exception edges due to our interprocedural analysis. A direct consequence of this reduction is seen in the "no throw" guarantee numbers, which represent the percentage of the total functions in the program, for which we are able to guarantee that no exceptions will be thrown by them. For coldet, which had the maximum reduction in the number of edges, the number of functions guaranteed not to throw is about 98%. For these benchmarks, the time taken to compute the IECFG is less than 5 s. Therefore, we believe that the analysis will scale to even larger examples.

Memory leaks in mailutils applications. We also applied the memory-leak checker module of F-Soft on two applications that use the mailutils library: (1) iconv, which converts strings from one character encoding to another using the mailutils library, and (2) murun, which tests the various kinds of streams in the mailutils library. F-Soft reported one memory leak in iconv and three memory leaks in murun involving exceptional control flow. The offending code snippet in iconv is shown in FIG. 13. In the try block, the invocation of the constructor FilterIconvStream( ) for variable cvt may throw an exception. However, when the exception is handled by the catch block, the memory allocated at the start of the try block is not deallocated, which results in a memory leak. The leaks reported in murun also have a similar flavor.

In addition, F-Soft reported a leak in iconv where the memory allocated in the constructor of class FilterIconvStream is never deallocated. Note that this leak occurs even when no exceptions are thrown by the application.

Conclusions and Future Work

We have now introduced an interprocedural analysis framework for accurately modeling C++ exceptions. In this framework, control flow induced by exceptions is captured in a modular interprocedural exception control flow graph (IECFG). This graph is refined by a novel dataflow analysis algorithm, which abstracts the types of exception objects over a domain of signed set of types. Unlike exception analyses proposed elsewhere for other languages, this analysis can be safely terminated at well-defined points during interprocedural propagation, thereby allowing clients to trade-off speed over precision.

Additionally, we have described a lowering transformation that uses the computed IECFG to generate an exception free program. This transformation is designed specifically to permit easier and more precise static analysis on the generated code.

Finally, we have demonstrated two exemplary applications of the framework: (a) automatic inference of exception specifications for C++ functions and (b) checking the "no throw" and "no leak" exception safety properties.

Figure 19:
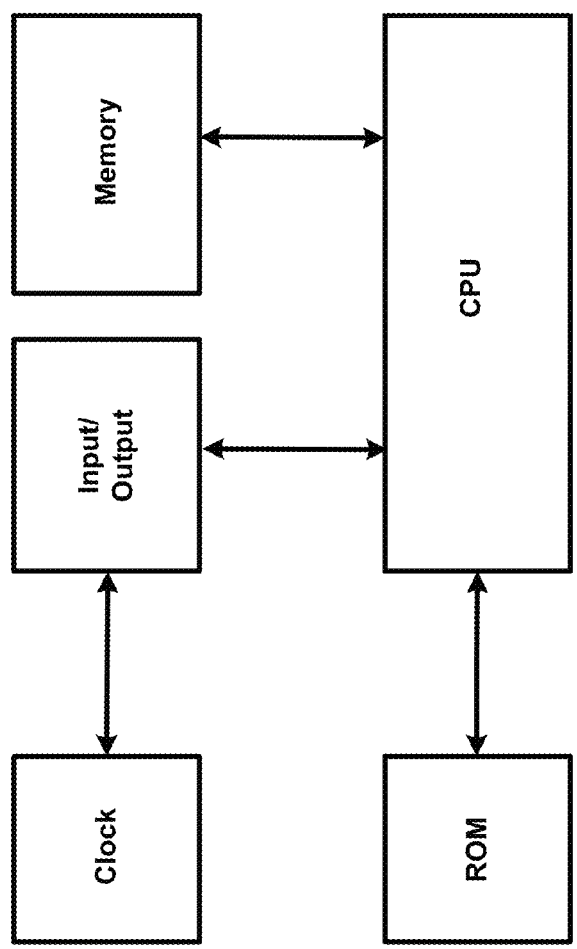
FIG. 19 is a block diagram of an exemplary computer system upon which the method of the present disclosure may be practiced.

At this point, while we have discussed and described exemplary embodiments and configurations of C++ exception analysis according to an aspect of the present disclosure, those skilled in the art will appreciate that a number of variations to those described are possible and contemplated. In particular, it is noted that exemplary embodiments may be performed on contemporary computing and/or data processing systems such as those shown in FIG. 19. More particularly, we intend to perform additional experiments on larger benchmarks. As shown previously, the IECFG computation presented here should scale well for larger benchmarks. Finally, we are investigating to selectively allow conditional exception edges during the IECFG construction. Such conditional exception edges could be used to model cases involving throwing destructors or other standard library objects such as cout more precisely. For example, a throwing destructor would be allowed to propagate the fact that std::uncaught exception( ) was queried before throwing an exception. This could be used to eliminate spurious calls to std::terminate( ) when returning from such destructors. Similarly, we can annotate other calls, such as uses of cout with the information that it may throw an exception, if the surrounding context had set the relevant information using the ios::exceptions( ) method. Such selective guards on exception edges would not substantially decrease the performance of the analysis but would allow further reduction of computed exception-catch links. Accordingly, the disclosure should be viewed as limited only by the scope of the claims that follow.

The invention claimed is:

1. A computer implemented method for generating an interprocedural exception control flow graph (IECFG) for a computer program comprising the steps of:
   building for each function within the computer program, an interprocedural exception flow graph that annotates an overapproximated set of signed types of exceptions for each exceptional control edge, and has exceptional exit and exceptional call-return nodes; and
   performing an interprocedural exception analysis on the interprocedural graphs built thereby generating the IECFG;
   wherein the overapproximated set signed types may include a positive set of exception types and a negative set of exception types, said negative set of exception types including every exception type other than those in the set.

2. The computer implemented method of claim 1 wherein the generated IECFG has nodes that represent exceptional returns from function calls, exceptional exits from functions, nodes which denote throwing and catching exceptions; and their associated sets of signed exception types.

3. The computer implemented method of claim 1 wherein the performing of the intraprocedural exception analysis may be terminated by a user at any well-defined point such that the result is an overapproximation of an actual set of exception types.

4. The computer implemented method of claim 1 further comprising the step of:
   generating a list of uncaught exceptions in the computer program.

5. The computer implemented method of claim 1 further comprising the step of:
   generating specifications related to exceptions for a function in the computer program.

6. The computer implemented method of claim 1 further comprising the steps of:
   verifying that a function does not have any exceptions; and
   outputting an indication that the function is without exceptions.

7. The computer implemented method of claim 1 further comprising the step of:
   using the exception types in the IECFG for performing compiler optimizations.

8. The computer implemented method of claim 1 wherein the building of an intraprocedural exception graph for each function includes stack unwinding to destruct objects on the stack and handles multiple live exceptions that may arise.

9. A computer implemented method for rewriting a first computer program having exceptions into a second computer program wherein exceptional behavior is captured using non-exception constructs through the use of an interprocedural exception control flow graph (IECFG) comprising the steps of:
   generating a set of local exception objects and a set of formal parameters for each function within the first computer program having exceptions;
   converting constructs within the first computer program associated with exceptional nodes in the IECFG into non-exceptional constructs; and
   outputting the second computer program which does not contain exceptional constructs;
   wherein said IECFG annotates an overapproximated set signed types that may include a positive set of exception types and a negative set of exception types, said negative set of exception types including every exception type other than those in the set.

10. The computer implemented method of claim 9 further comprising the step of:
    verifying that a function does not have any exceptions; and
    outputting an indication that the function is without exceptions.

11. The computer implemented method of claim 10 further comprising the step of:
    verifying that an exception path does not include any resource leaks; and
    outputting an indication that the function is without resource leaks.

12. A system comprising:
    a machine-readable storage device for storing instructions; and
    data processing apparatus operable to execute the instructions and to perform operations for generating an interprocedural exception control flow graph (IECFG) for a computer program comprising the steps of:
      building for each function within the computer program, an intraprocedural exception flow graph that annotates an overapproximated set of signed types of exceptions for each exceptional control edge, and has exceptional exit and exceptional call-return nodes; and
      performing an interprocedural exception analysis on the interprocedural graphs built thereby generating the IECFG;
      wherein the overapproximated set of signed types may include a positive set of exception types and a negative set of exception types, said negative set of exception types including every exception type other than those in the set.

13. The system of claim 12 wherein the generated IECFG has nodes that represent exceptional returns from function calls, exceptional exits from functions, nodes which denote throwing and catching exceptions; and their associated sets of signed exception types.

14. The system of claim 12 wherein the performing of the interprocedural exception analysis may be terminated by a user at any well-defined point such that the result is an over-approximation of an actual set of exception types.

15. The system of claim 12 further operable to execute the instructions and perform the step of:

generating a list of uncaught exceptions in the computer program.

16. The system of claim 12 further operable to execute the instructions and perform the step of:

generating specifications related to exceptions for a function in the computer program.

17. The system of claim 12 further operable to execute the instructions and perform the steps of:

verifying that a function does not have any exceptions; and outputting an indication that the function is without exceptions.

18. The system of claim 12 further operable to execute the instructions and perform the step of:

using the exception types in the IECFG for performing compiler optimizations.

19. The system of claim 12 wherein the building of an intraprocedural exception graph for each function includes stack unwinding to destruct objects on the stack and handles multiple live exceptions that may arise.

20. A system comprising:

a machine-readable storage device for storing instructions; and data processing apparatus operable to execute the instructions and to perform operations that rewrite a first computer program having exceptions into a second computer program wherein exceptional behavior is captured using non-exception constructs through the use of an interprocedural exception control flow graph (IECFG) comprising the steps of:

generating a set of local exception objects and a set of formal parameters for each function within the first computer program having exceptions;

converting constructs within the first computer program associated with exceptional nodes in the IECFG into non-exceptional constructs; and outputting the second computer program which does not contain exceptional constructs;

wherein said IECFG annotates an overapproximated set signed types that may include a positive set of exception types and a negative set of exception types, said negative set of exception types including every exception type other than those in the set.

21. The system of claim 20 further operable to execute the instructions and perform the steps of:

verifying that a function does not have any exceptions; and outputting an indication that the function is without exceptions.

22. The system of claim 20 further operable to execute the instructions and perform the steps of:

verifying that an exception path does not include any resource leaks; and outputting an indication that the function is without resource leaks.

* * * * *